(12) United States Patent
Dintenfass et al.

(10) Patent No.: US 10,635,506 B1
(45) Date of Patent: Apr. 28, 2020

(54) SYSTEM FOR RESOURCE REQUIREMENTS AGGREGATION AND CATEGORIZATION

(71) Applicant: BANK OF AMERICA CORPORATION, Charlotte, NC (US)

(72) Inventors: Katherine Dintenfass, Lincoln, RI (US); Paul Adam Keifer, Hudsonville, MI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/267,519

(22) Filed: Feb. 5, 2019

(51) Int. Cl.
*G06F 3/00* (2006.01)
*G06F 9/54* (2006.01)
*G06F 9/50* (2006.01)
*G06F 16/9035* (2019.01)
*G06N 20/00* (2019.01)

(52) U.S. Cl.
CPC ............ *G06F 9/542* (2013.01); *G06F 9/5038* (2013.01); *G06F 9/5061* (2013.01); *G06F 16/9035* (2019.01); *G06N 20/00* (2019.01)

(58) Field of Classification Search
CPC ...................................................... G06F 9/541
USPC ...................................................... 719/318
See application file for complete search history.

(56) References Cited

U.S. PATENT DOCUMENTS

| 6,236,975 | B1 | 5/2001 | Boe et al. |
| 7,020,626 | B1 | 3/2006 | Eng et al. |
| 7,330,850 | B1 | 2/2008 | Seibel et al. |
| 7,349,881 | B1 | 3/2008 | Lockwood |
| 7,398,236 | B2 | 7/2008 | Jaffe |
| 7,447,656 | B2 | 11/2008 | Parthasarathy |
| 7,447,659 | B2 | 11/2008 | Parthasarathy |
| 7,689,507 | B2 | 3/2010 | Hung et al. |
| 7,734,641 | B2 | 6/2010 | Kanigsberg et al. |
| 7,752,102 | B2 | 7/2010 | Thomas |
| 7,792,697 | B2 | 9/2010 | Bhagchandani et al. |
| 7,797,208 | B2 | 9/2010 | Thomas |
| 7,873,569 | B1 | 1/2011 | Cahn |
| 8,024,213 | B1 | 9/2011 | Fano et al. |
| 8,144,007 | B2 | 3/2012 | Tuck et al. |
| 8,285,622 | B1 | 10/2012 | Rao et al. |
| 8,301,514 | B1 | 10/2012 | Vippagunta |
| 8,417,584 | B2 | 4/2013 | Ross |

(Continued)

OTHER PUBLICATIONS

René Meier, State of the Art Review of Distributed Event Models. (Year: 2000).*

(Continued)

*Primary Examiner* — Lechi Truong
(74) *Attorney, Agent, or Firm* — Michael A. Springs; Moore & Van Allen PLLC; Nicholas C. Russell (57) ABSTRACT

Embodiments of the present invention provide a positioned system for passive scanning and evaluation of various event execution of a user to use in combination for aggregation and categorization of resource requirements. The system integrates bots for user applications, geolocation, and beacons to determine event execution by the user. The system may extract and pull data into analytics to understand event patterning of the user. Furthermore, the system extracts priority event data from across multiple users for aggregation of the priority data into various categories of users to create groups and provide more accurate data for artificial intelligence analysis and filtering for user priorities.

14 Claims, 8 Drawing Sheets

(56) References Cited

U.S. PATENT DOCUMENTS

| | | | |
|---|---|---|---|
| 8,473,380 | B2 | 6/2013 | Thomas et al. |
| 8,478,691 | B2 | 7/2013 | Solomon et al. |
| 8,571,919 | B2 | 10/2013 | Rane et al. |
| 8,571,975 | B1 | 10/2013 | Lehman et al. |
| 8,572,072 | B1 | 10/2013 | Roumeliotis |
| 8,666,836 | B2 | 3/2014 | Adams |
| 8,782,076 | B2 | 7/2014 | Rothman et al. |
| 8,838,499 | B2 | 9/2014 | Del Bene et al. |
| 9,256,876 | B2 | 2/2016 | Vasant Akole et al. |
| 9,311,386 | B1 | 4/2016 | Song et al. |
| 9,460,468 | B2 | 10/2016 | Boberski et al. |
| 9,495,703 | B1 | 11/2016 | Kaye, III |
| 9,672,283 | B2 | 6/2017 | Pappas et al. |
| 9,710,821 | B2 | 7/2017 | Heath |
| 9,767,182 | B1 | 9/2017 | Thakur et al. |
| 9,836,765 | B2 * | 12/2017 | Hariri ................ G06Q 30/0269 |
| 9,875,491 | B2 | 1/2018 | Weksler |
| 2008/0033852 | A1 | 2/2008 | Megdal et al. |
| 2010/0145772 | A1 | 6/2010 | McCauley et al. |
| 2011/0082718 | A1 | 4/2011 | Ghosh et al. |
| 2011/0178848 | A1 | 7/2011 | Rane et al. |
| 2012/0005053 | A1 | 1/2012 | Burgess et al. |
| 2013/0054314 | A1 | 2/2013 | Ross et al. |
| 2013/0311326 | A1 | 11/2013 | Lucas et al. |
| 2014/0025491 | A1 | 1/2014 | Nagarajan et al. |
| 2014/0086056 | A1 * | 3/2014 | Casey .................... H04L 47/10 370/235 |
| 2014/0095251 | A1 | 4/2014 | Huovilainen |
| 2016/0071201 | A1 | 3/2016 | Zhang et al. |
| 2016/0180465 | A1 | 6/2016 | Deperro et al. |
| 2016/0371772 | A1 | 12/2016 | Zuluaga Rueda et al. |
| 2017/0011444 | A1 | 1/2017 | Greystoke et al. |
| 2017/0024813 | A1 | 1/2017 | Crouspeyre et al. |
| 2017/0061535 | A1 | 3/2017 | Williams |
| 2017/0193501 | A1 | 7/2017 | Cole et al. |
| 2017/0286155 | A1 * | 10/2017 | Hosabettu ............. G06F 3/0482 |
| 2018/0005323 | A1 | 1/2018 | Grassadonia |
| 2018/0096313 | A1 | 4/2018 | Chenard et al. |
| 2018/0144412 | A1 | 5/2018 | Chenard et al. |
| 2018/0189888 | A1 | 7/2018 | Deperro et al. |
| 2018/0218176 | A1 | 8/2018 | Voorhees et al. |
| 2018/0232705 | A1 * | 8/2018 | Baker ................ G06Q 10/1095 |
| 2018/0276710 | A1 | 9/2018 | Tietzen et al. |

OTHER PUBLICATIONS http://theconversation.com/when-ai-meets-your-shopping-experience-it-knows-what-you-buy-and-what-you-ought-to-buy-101737.
orpheus-it.com/big-data/artificial-intelligence-in-procurement.

* cited by examiner

SYSTEM FOR RESOURCE REQUIREMENTS AGGREGATION AND CATEGORIZATION

BACKGROUND

Event execution, subsequent analysis, and resolution of executed events typically require timely communication between multiple systems and entities. Thus systems lag in providing users with real time resource requirements for event execution. Therefore, there is a need for a system to efficiently provide tailored solutions to facilitate execution of priorities and events.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In some embodiments, the system is positioned to passively scan and evaluate various event execution of a user to determine future resource requirements for predictive event execution. The system studies user applications, internet activities, fitness activities, geolocation activities, and beacon recognitions to determine and make recommendations for predictive event execution by the user. These events may include financial events, health events, or the like, such as home buying, health care cost, health care givers, or the like that the user may be responsible for. The system may access data via bots based on user permissions. The system may extract and pull data and use the bots to pull into analytics to understand event patterning of the user. The system utilizes specificity filtering based on specifics of users and constantly, in real time updates a set of priority events for the user. The system may further modify and filter the data to remove false indications that do not match the user.

Furthermore, the system extracts the priority event data from across multiple users. The system aggregates the priority data into various categories of users to create groups and provide more accurate data for artificial intelligence analysis. Processing of the data reveals various resource needs and providers. It also allows for correlation of one user's data with the group to better filter down to the user's priorities, such as narrowing that the user is interested in purchasing a car, to a possible type of car based on others in the group category. It also allows to determine highest priority from list of priorities.

In some embodiments, the system aggregates the priority data into various categories of users to create groups and provide more accurate data for artificial intelligence analysis. Processing of the data reveals various resources needs and providers.

Embodiments of the present invention address the above needs and/or achieve other advantages by providing apparatuses (e.g., a system, computer program product and/or other devices) and methods for resource requirement aggregation and categorization, the invention comprising: receiving authentication from a user for real time assessment within a user network; identifying one or more devices and locations across the user network associated with the user; deploying bots at the one or more devices and locations across the user network; initiating passive scanning via the bots, wherein passive scanning identifies data communications associated the user; performing event patterning analytics, wherein pattern analytics transform data communications associated with the user to priority data for predicting user events; generating a dynamic filtered event priority list listing the predicted user events from the patterning analytics; aggregating the priority data across multiple users; grouping the users based on the priority data; identifying filtered down specificity identification for priority event via artificial intelligence analysis engine; and determining user priority list accuracy based on event history of users within the group.

In some embodiments, grouping the users based on the priority data further comprises grouping users based on same life event history and geolocation.

In some embodiments, identifying filtered down specificity identification for priority event via artificial intelligence analysis further comprises identifying specificity of the priority event based on group tendencies when users within the group perform the priority event of the user.

In some embodiments, the invention further comprises, upon receiving user confirmation of user priority list accuracy, providing a communicable feedback loop to the artificial intelligence analysis engine confirming model prediction accuracy.

In some embodiments, deploying passive bots at one or more locations across the user network further comprises systematic passive scanning of communications across each of the one or more devices and locations across the user network associated with the user.

In some embodiments, initiating passive scanning via the bots further comprises extracting data across the user network for identification of current or historic user events, wherein user events include financial, social, or location modification events of the user.

In some embodiments, deploying passive bots at one or more locations across the user network further comprises deploying passive bots at user applications, fitness applications, beacon applications, internet portals, geolocation devices, and financial applications.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described some embodiments of the present invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, management firms, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, a "resource pool" or an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, or the like. The account is associated with and/or maintained by the entity.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

In some embodiments, the system is positioned to passively scan and evaluate various event execution of a user to determine future resource requirements for predictive event execution. The system studies user applications, internet activities, fitness activities, geolocation activities, and beacon recognitions to determine and make recommendations for predictive event execution by the user. These events may include financial events, health events, or the like, such as home buying, health care cost, health care givers, or the like that the user may be responsible for. The system may access data via bots based on user permissions. The system may extract and pull data and use the bots to pull into analytics to understand event patterning of the user. The system utilizes specificity filtering based on specifics of users and constantly, in real time updates a set of priority events for the user. The system may further modify and filter the data to remove false indications that do not match the user.

Furthermore, the system extracts the priority event data from across multiple users. The system aggregates the priority data into various categories of users to create groups and provide more accurate data for artificial intelligence analysis. Processing of the data reveals various resource needs and providers. It also allows for correlation of one user's data with the group to better filter down to the user's priorities, such as narrowing that the user is interested in purchasing a car, to a possible type of car based on others in the group category. It also allows to determine highest priority from list of priorities.

Figure 1:
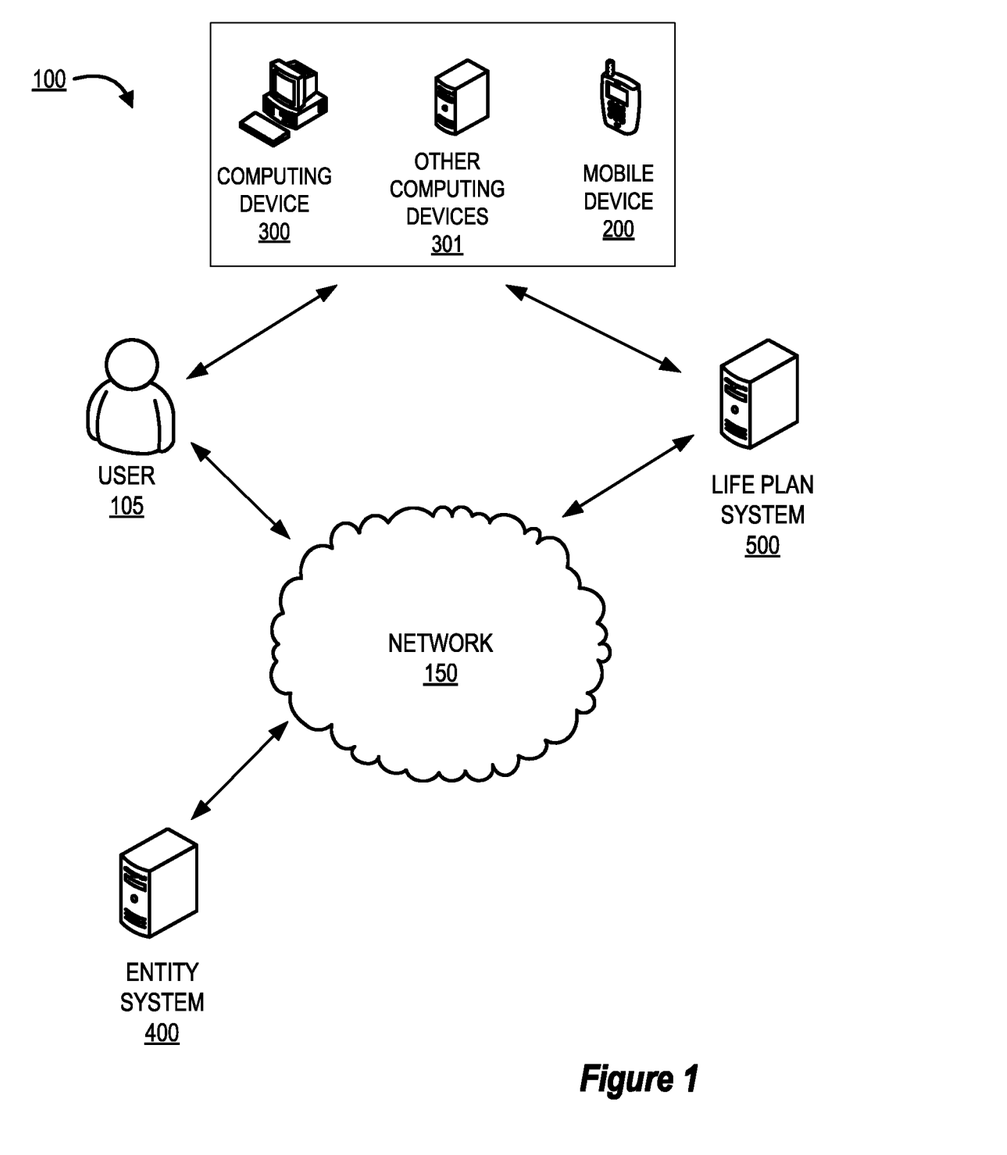
FIG. 1 presents an aggregation and categorization system environment, in accordance with one embodiments of the present invention.

FIG. 1 illustrates an aggregation and categorization system environment 100, in accordance with one embodiments of the present invention. As depicted in the embodiment of FIG. 1, the system environment 100 may include a life plan system 500 interacting with an entity system 400 and a user 105 using a network 150. In some embodiments, the life plan system 500 may be maintained by the entity. In some embodiments, the life plan system 500 may be owned by the entity and maintained by a third party. In some embodiments, the life plan system 500 may be a part of the entity system 400. In some embodiments, the user 105 may be customer of the entity. In some embodiments, an associate with an associate device may be associated with the entity and entity system 400. The associate may be a financial solutions advisor, a customer care associate, a lending specialist, and/or the like. In some embodiments, the system environment 100 may include other third party systems and other entity systems. In some embodiments, the life plan system 500 may interact simultaneously with a plurality of users and a plurality of associates associated with the entity.

The environment 100 also may include a plurality of user devices. The user devices may include any machine, apparatus, system or the like that may be connected to and communicate with other devices over a network 150. At least one of the devices may include a computing device 300, other computing devices 301, and a mobile device 200 for use by the user 105. The computing devices 301 may be any device that employs a processor and memory and can perform computing functions, such as a computing device 300 or a mobile device 200, that may be connected to or access the network 150. The computing device 300 may include a personal computer such as a desktop computer, laptop computer, tablet or any type of computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may include any mobile communication device, such as a cellular telecommunications device (i.e., a cell phone or mobile phone), personal digital assistant (PDA), a mobile Internet accessing device, tablet computer, or other mobile device. A mobile device may connect to the network by a cellular telecommunications network or by Wi-Fi, Bluetooth or other access technology.

Figure 2:
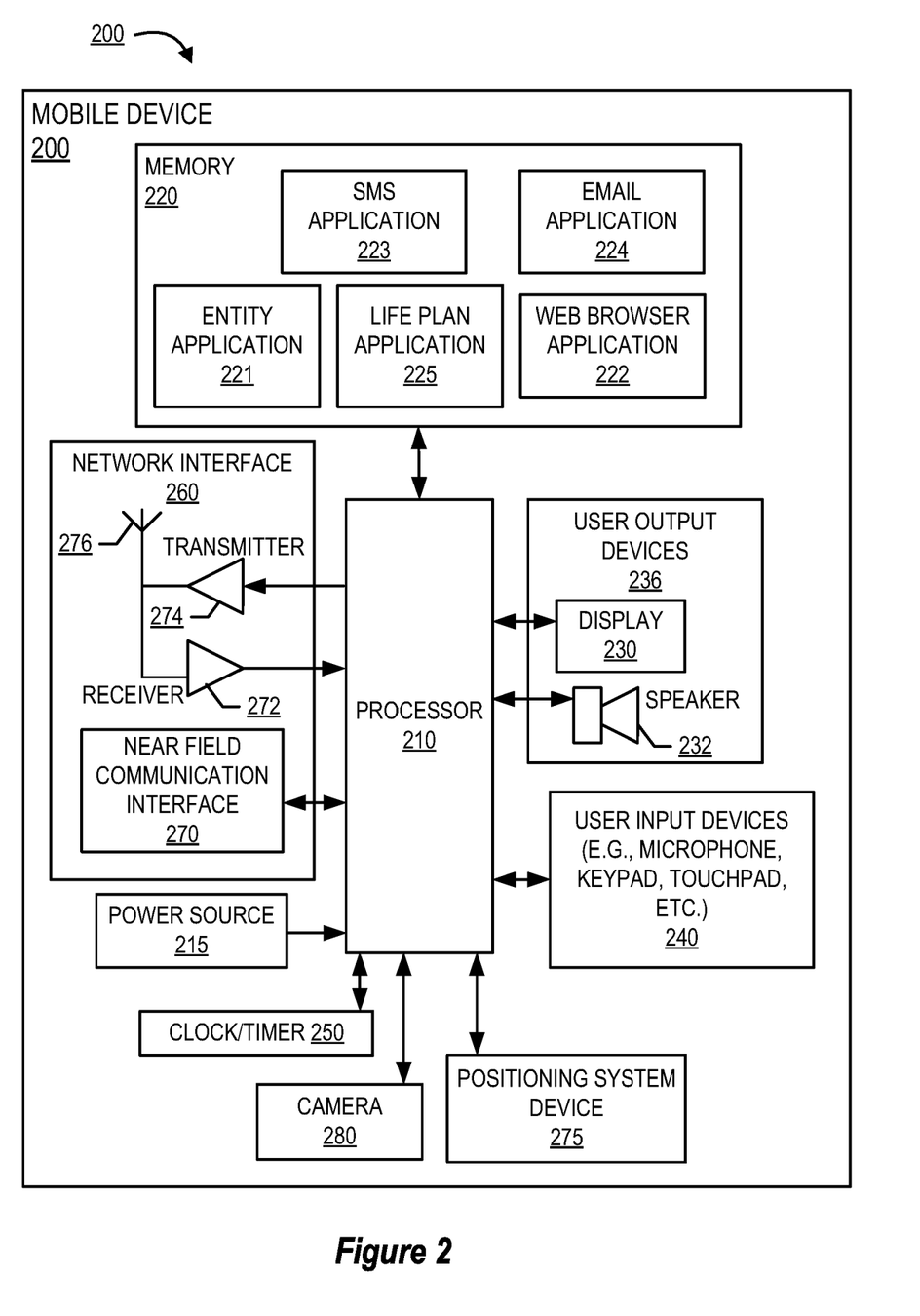
FIG. 2, presents a block diagram illustrating a mobile device illustrated in FIG. 1, in accordance with embodiments of the present invention.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, Global Positioning Systems (GPS) devices, or any combination of the aforementioned. In some embodiments, the mobile device may be a wearable device.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail application 224 and SMS application 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols, with fifth-generation (5G) wireless communication protocols, and/or the like. The mobile device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the mobile device 200. In some embodiments, the NFC interface 270 is not supported in and/or on the mobile device 200, but the NFC interface 270 is otherwise operatively connected to the mobile device 200 (e.g., where the NFC interface 270 is a peripheral device plugged into the mobile device 200). Other apparatuses having NFC interfaces mentioned herein may be configured similarly. In some embodiments, the NFC interface 270 of the mobile device 200 is configured to contactlessly and/or wirelessly communicate information to and/or from a corresponding NFC interface of another apparatus (e.g., a wearable device or another mobile or computing device).

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a location to determine that the mobile device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which include computer-executable instructions/code executed by the processor 210 to implement the functions of the mobile device 200 and/or one or more of the process/method steps described herein. The memory 220 includes an entity application 221 that may be used to allow communication with an entity system such as the entity system 400 and/or the smart devices to implement the system of the invention. The use of the entity application 221 may facilitate access to the system of the invention by providing log-in systems including user authentication systems, account information, system controls or the like. The memory 220 includes a life plan application 225 that may be used to communicate with the life plan system 500. The entity application 221 and life plan application 225 communicate with the life plan system 500 and the entity system 400 to allow the user to set up and/or control the system of the invention. In some embodiments, the entity application 221 is an online banking application. In some embodiments, the entity application 221 and life plan application 225 are part of a single application.

These applications also typically provide a graphical user interface (GUI) on the display 230 that allows the user 105 to communicate with the mobile device 200, the entity system 400 and/or other devices or systems. For example, the life plan application 225 and the entity application 221 may provide a life plan user interface for the user 105. The life plan application 225 installed on user devices such as the mobile device 200 may provide different functions and different interfaces to the user 105 to perform one or more steps of process flows described herein. The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information.

Figure 3:
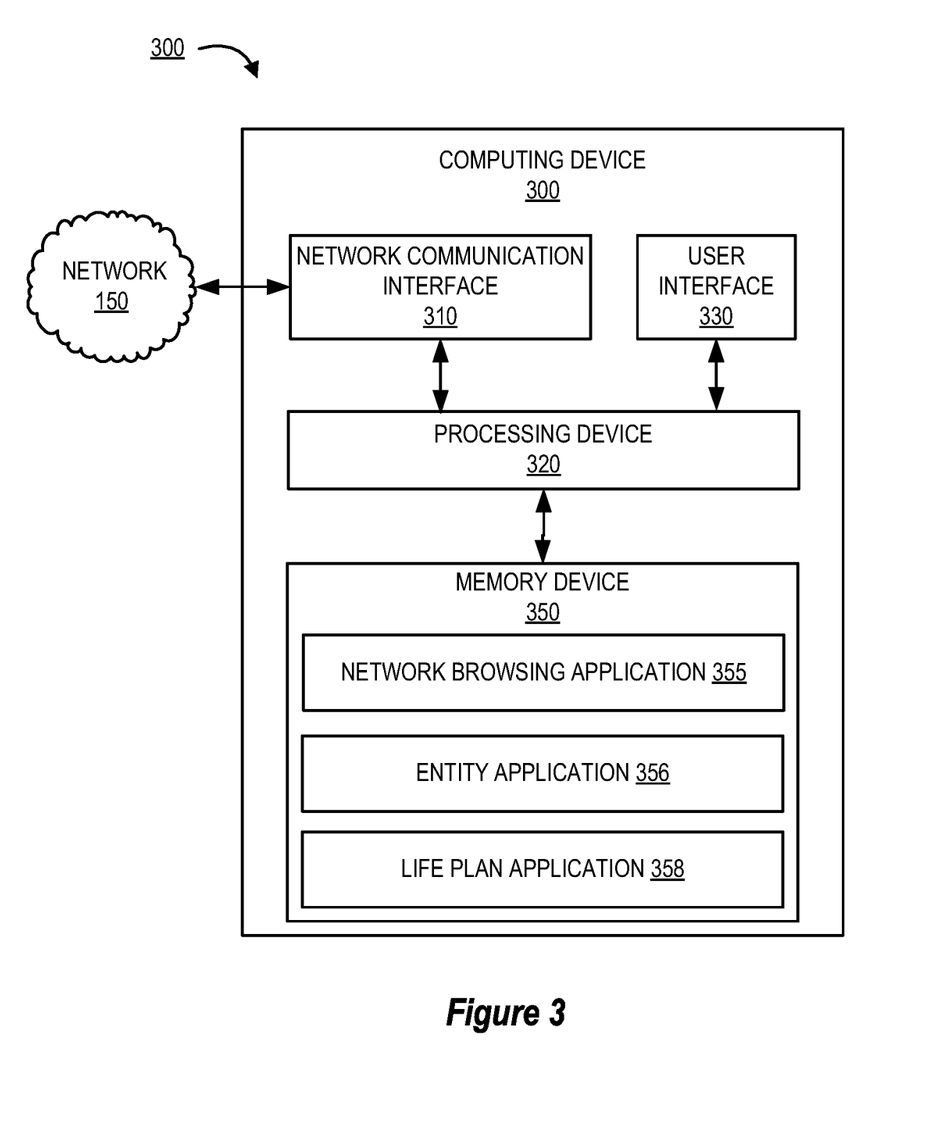
FIG. 3 presents a block diagram illustrating a computing device illustrated in FIG. 1, in accordance with embodiments of the present invention.

Referring now to FIG. 3, the computing device 300 also includes various features, such as a network communication interface 310, a processing device 320, a user interface 330, and a memory device 350. The network communication interface 310 includes a device that allows the computing device 300 to communicate over the network 150 (shown in FIG. 1). In one embodiment of the invention, a network browsing application 355 provides for a user to establish network communication with an entity system 400 and life plan system 500.

As used herein, a "processor" or "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in memory device 350. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. In one exemplary embodiment of the present invention, the graphical user interface may be a life plan user interface for the user 105 provided by the system to receive input and display information to the user 105. The user interface 330 employs certain input and output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space for temporarily or permanently storing data and/or commands provided to the processing device 320 when it carries out its functions described herein. The memory device 350 may include such applications as a conventional network browsing application 355, an entity application 356, a life plan application 358 and/or the like. The entity application 356 may be used to allow communication with an entity system, such as the entity system 400. The life plan application 358 may be used to allow communication with the life plan system 500 and the entity system 400 to implement one or more actions. The other computing devices 301 as shown in FIG. 1 may include similar system blocks as the computing device 300.

Figure 4:
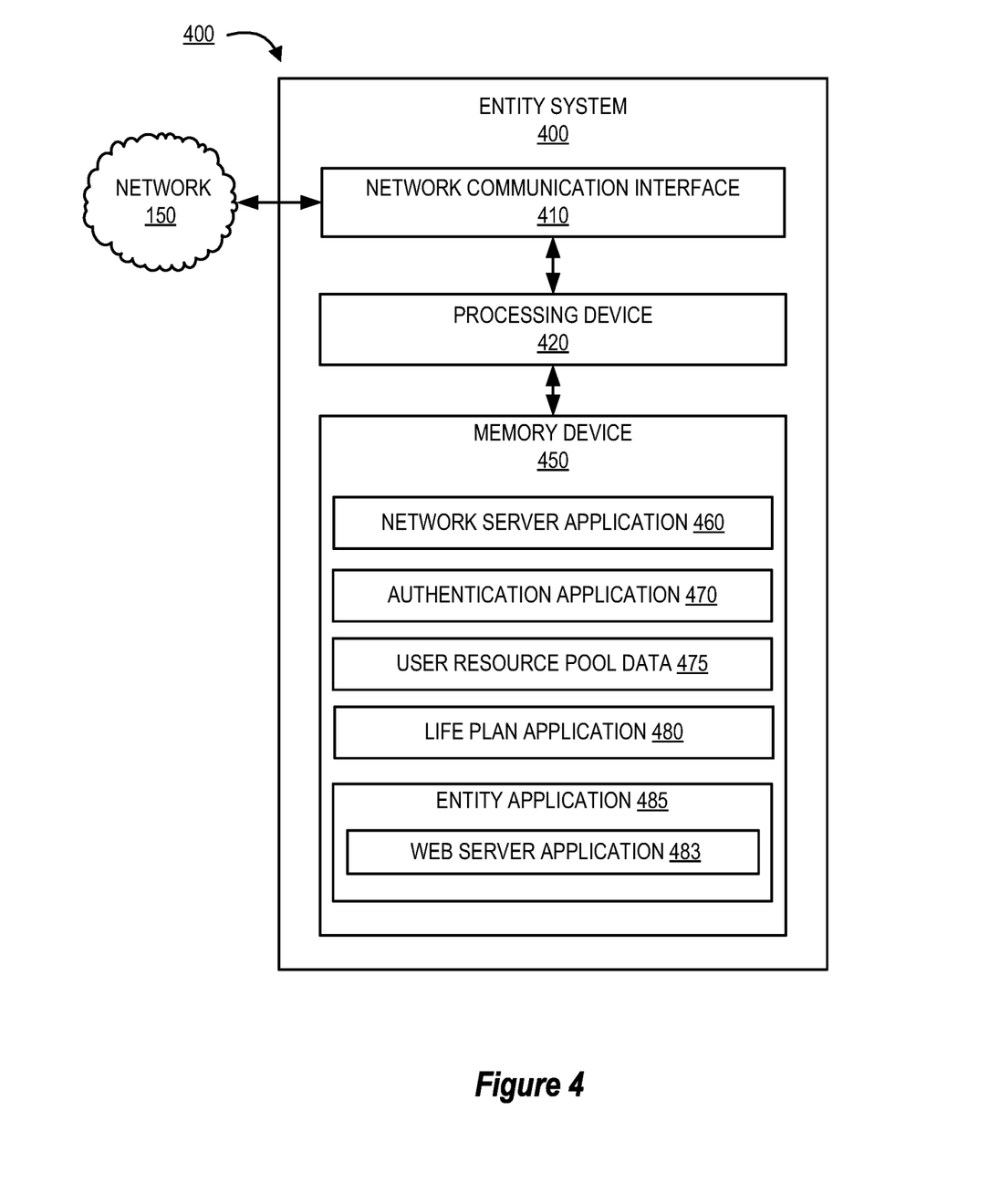
FIG. 4 presents a block diagram illustrating the entity system(s) of FIG. 1, in accordance with embodiments of the present invention.

FIG. 4 provides a block diagram illustrating the entity system 400, in greater detail, in accordance with embodiments of the invention. As illustrated in FIG. 4, in one embodiment of the invention, the entity system 400 includes one or more processing devices 420 operatively coupled to a network communication interface 410 and a memory device 450. In certain embodiments, the entity system 400 is operated by an entity, such as a financial institution.

It should be understood that the memory device 450 may include one or more databases or other data structures/repositories. In one embodiments of the present invention, the memory device 450 includes data stores comprising information about one or more resource pools associated with a plurality of users associated with the entity. The memory device 450 also includes computer-executable program code that instructs the processing device 420 to operate the network communication interface 410 to perform certain communication functions of the entity system 400 described herein. For example, in one embodiment of the entity system 400, the memory device 450 includes, but is not limited to, a network server application 460, an authentication application 470, user resource pool data 475, a life plan application 480, an entity application 485 including a mobile web server application 483, and other computer-executable instructions or other data. The computer-executable program code of the network server application 460, the authentication application 470, life plan application 480, or the entity application 485 may instruct the processing device 420 to perform certain logic, data-processing, and data-storing functions of the entity system 400 described herein, as well as communication functions of the entity system 400. The entity application 485 communicates with the user devices to facilitate communication between the user and the entity. The entity application 485 may be a mobile banking application. In one embodiment, the life plan application 480 may be a part of the entity application 485.

In one embodiment, the network server application 460, the authentication application 470, and the entity application 485 are configured to invoke or use the customer authentication data stored in the memory when authenticating a user to the entity system 400. In some embodiments, the life plan application 480 allows communication with the life plan system 500. The user resource pool data 475 comprises information of all resource pools of a plurality of users associated with the entity managing the entity system 400.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the computing device 300, other computing devices 301, and life plan system 500. The processing device 420 is configured to use the network communication interface 410 to transmit and/or receive data and/or commands to and/or from the other devices connected to the network 150.

Figure 5:
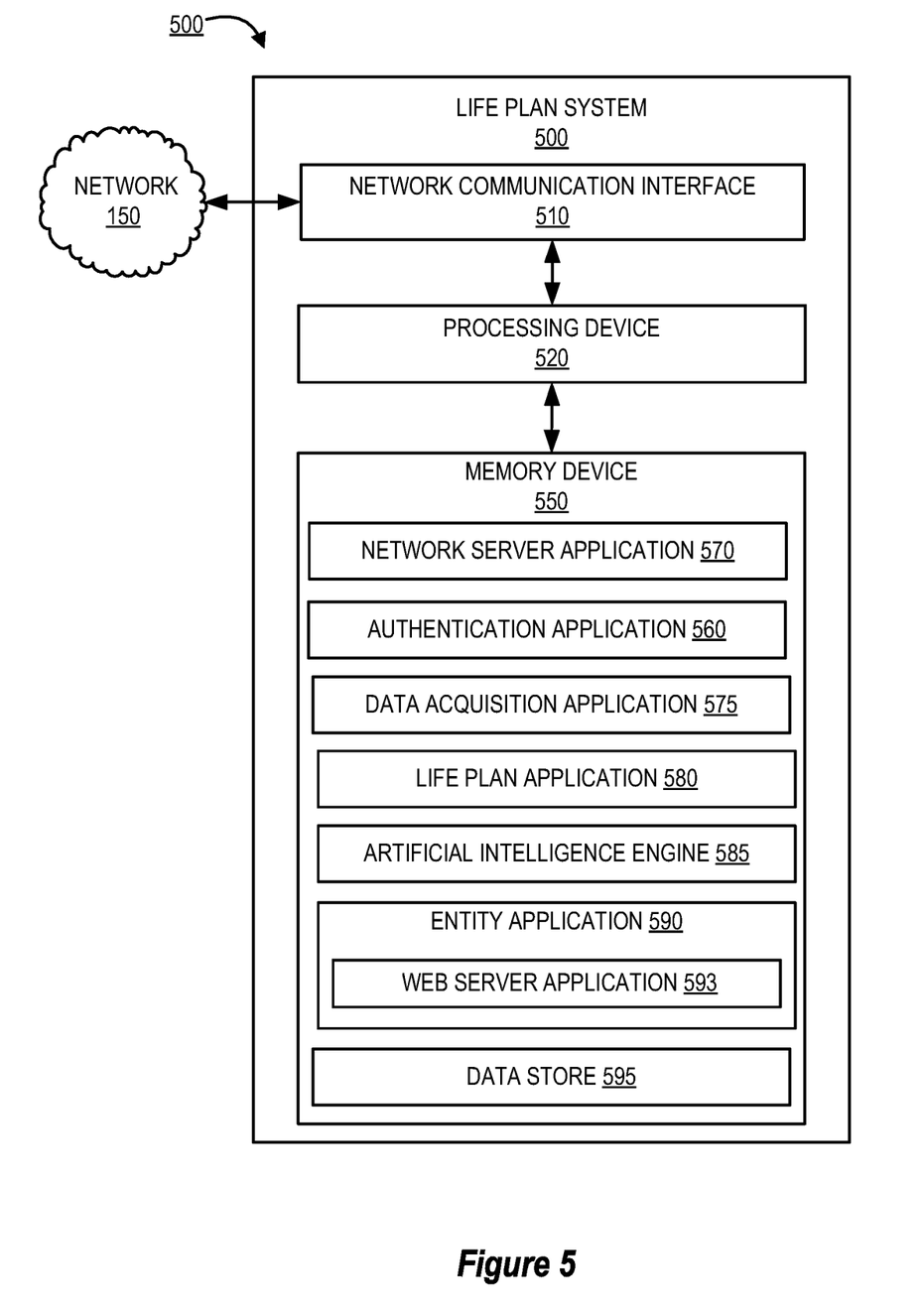
FIG. 5 presents a block diagram illustrating the life plan system of FIG. 1, in accordance with embodiments of the present invention.

FIG. 5 presents a block diagram illustrating the life plan system 500, in accordance with embodiments of the invention. As illustrated in FIG. 4, in one embodiment of the invention, the life plan system 500 includes one or more processing devices 520 operatively coupled to a network communication interface 510 and a memory device 550. In certain embodiments, the life plan system 500 is operated by an entity, such as a financial institution.

It should be understood that the memory device 550 may include one or more databases or other data structures/repositories. The memory device 550 also includes computer-executable program code that instructs the processing device 520 to operate the network communication interface 510 to perform certain communication functions of the life plan system 500 described herein. For example, in one embodiment of the life plan system 500, the memory device 550 includes, but is not limited to, a network server application 570, an authentication application 560, a data acquisition application 575, a life plan application 580, an artificial intelligence engine 585, a data store 595 and an entity application 590 including a web server application 593, and other computer-executable instructions or other data. The computer-executable program code of the network server application 570, the authentication application 560, the data acquisition application 575, the life plan application 580, the artificial intelligence engine 585, the entity application 590, or the web server application 593 may instruct the processing device 520 to perform certain logic, data-processing, and data-storing functions of the life plan system 500 described herein, as well as communication functions of the life plan system 500. The entity application 590 and the life plan application 580 may be part of the same application. The data acquisition application 575 communicates with the entity system 400 to extract resource pool data associated with a plurality of users. The life plan application 580 or the entity application 590 communicate with the entity application 221 or the life plan application 225 in the mobile device 200 and entity application 356 or life plan application 358 in the computing device 300 to facilitate one or more steps in the process flows described herein. The data store 595 may include life plan data associated with the plurality of users.

As used herein, a "communication interface" generally includes a modem, server, transceiver, and/or other device for communicating with other devices on a network. The network communication interface 510 is a communication interface having one or more communication devices configured to communicate with one or more other devices on the network 150, such as the mobile device 200, the computing device 300, and/or other computing devices 301. The processing device 520 is configured to use the network communication interface 510 to transmit and/or receive data and/or commands to and/or from the other devices connected to the network 150.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 550 includes any computer memory that provides an actual or virtual space for temporarily or permanently storing data and/or commands provided to the processing device 520 when it carries out its functions described herein.

Figure 6:
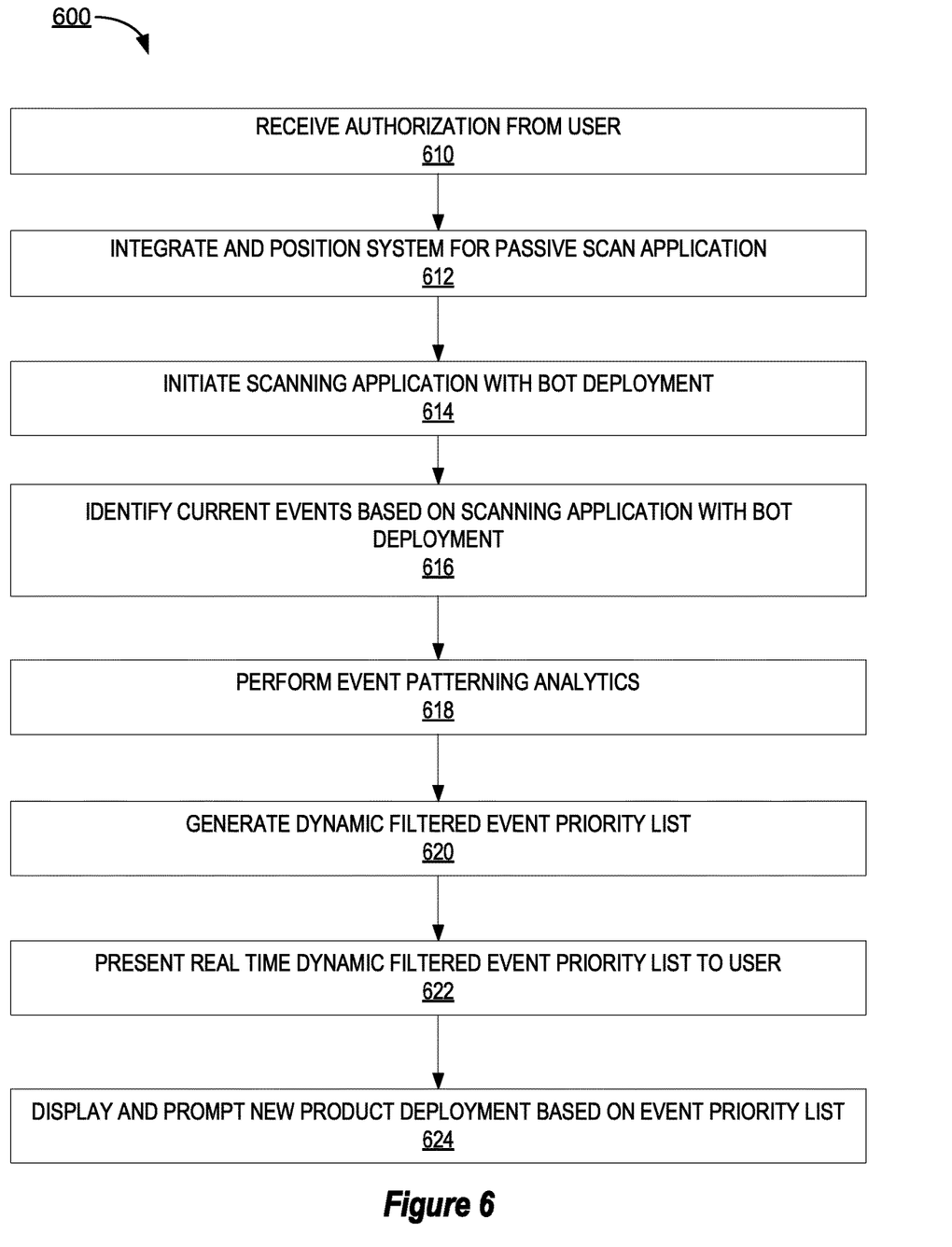
FIG. 6 presents a process flow for aggregation and categorization system setup and deployment, in accordance with embodiments of the present invention.

FIG. 6 presents a process flow for an aggregation and categorization system setup and deployment 600, in accordance with embodiments of the present invention. As illustrated in block 610, the process 600 is initiated by receiving authorization from the user for system integration. In this way, the user may provide authorization for system integration within the user mobile device for assessment and prioritization of resource requirements. The user may provide authentication via the user mobile device or at an entity location. The user authentication may be a single authentication for the system to be initiated.

As illustrated in block 612, the process 600 continues by integrating and positioning the system for passive scan application of the user. This may include scan of the user device, user transactions, user events, user actions, and the like. In this way, the system may integrate bots into the user device to studies applications, web activities, fitness activities, geolocations, and beacons to identify events the user has performed. As illustrated in block 614, the system may imitate scanning of user applications via bot deployment. In this way, the bots may passively scan the user systems to identify communications, resource distributions, locations, and the like associated with the user. The bot deployment may compile a series of data points that link together based on known modeling to identify an event, such as a life event that may be occurring in a user's life. These events may include financial events, social events, milestone events, or the like.

As illustrated in block 616, the process 600 continues by identifying current events the user is or has been a part of based on the scanning of the applications with the bot deployment. In this way, the bots passively scan and gather data. The gathered data is compared to models that provide a prediction of one or more life events occurring to the user at that time. These data points are then passed, in real time, to the system for event patterning analytics. As illustrated in block 618, the system may perform event patterning analytics on the data scanned via the passive bot integration.

Once the event patterning analytics are conducted, the system may generate a dynamic filtered event priority list, as illustrated in block 620. The event priority list may be a list of predicted events that may be in the future for the user. These events may include financial events, social events, life events, or the like. The user may be saving resources for the event, spending resources in preparation for the event, traveling for the event, or the like. The bots may identify trends in the resource distribution and geographic location of the user that predict that the user is preparing for one or more of these events. The list may be dynamic in that the list may change in real time based on bot data scanned and processed. The real time dynamic filtered event priority list may be presented to the user, as illustrated in block 622. The event priority list may be provided to the user via an interface on the user mobile device. The list may be generated and provided on the interface independent of the application or program being ran on the device. The priority list may be interactive such that the user may be able confirm that the events on the list are in fact the user's priorities. Upon confirmation, the system may provide a feedback loop to the analytics indicating that the data extracted by the bots did conform to the model of a user future predicted event based on the user confirmation. Finally, as illustrated in block 624, the process 600 is completed by displaying and prompting potential new product and service developments to the user based on the events on the filtered event priority list.

The system may identify life events such as "job change," "marriage/divorce," "welcome a child," "buy/sell home," "upcoming travel," "retirement," "end of life," and/or the like. The system based on the extracted information associated with the bots and performed pattern analytics may identify the one or more events that the user is currently in. For example, the system may identify that one or more transactions, locations, or the like based on passive bot scanning associated with the resource pools that are related to buying a crib and other baby related products and may predict the event "welcome a child." In some cases, the system may periodically prompt the user, via the interface, to identify any upcoming events. In some embodiments, the system may identify the one or more events based on social networking bot scanning. For example, the system may identify the event "job change" based on identifying that the user has updated job title or employer in the social networking page. In some other embodiments, the system may identify the one or more events based on information based on email accounts passive bot scanning. For example, the system may identify the event "upcoming travel" by accessing travel itinerary of the user from the email account of the user. In some embodiments, the system in response to identifying the one or more events, displays it to the user via the interface.

The system, based on identifying the one or more events, generates a list of predicted upcoming events and task associated with each of the predicted events. For example, the system identifies that the user is about to experience "a job change" and may create a list of tasks such as updating addresses associated with one or more accounts of the user and/or the like. In another example, wherein the event is identified as marriage, the system may create a list of tasks including adding spouse to one or more accounts of the user, opening a joint account, ordering a new debit card, and/or the like. The system may store the list and the tasks associated with each of the events on the list in the data store.

In some embodiments, the event priority list may be dynamic and changing. In this way, the system may receive input from the user, wherein the user input is associated with a change in the at least one potential event associated with the user. In some embodiments, the user may input the change via the interface. In alternate embodiments, the associate may input the change via an interface. The system may, in real time, generate a new list, dynamically accepting the user change along with a task associated with the change based on receiving the user input from the user. The new list and task associated with the user may be stored in the data store, which may be presented to the user via the interface.

Figure 7:
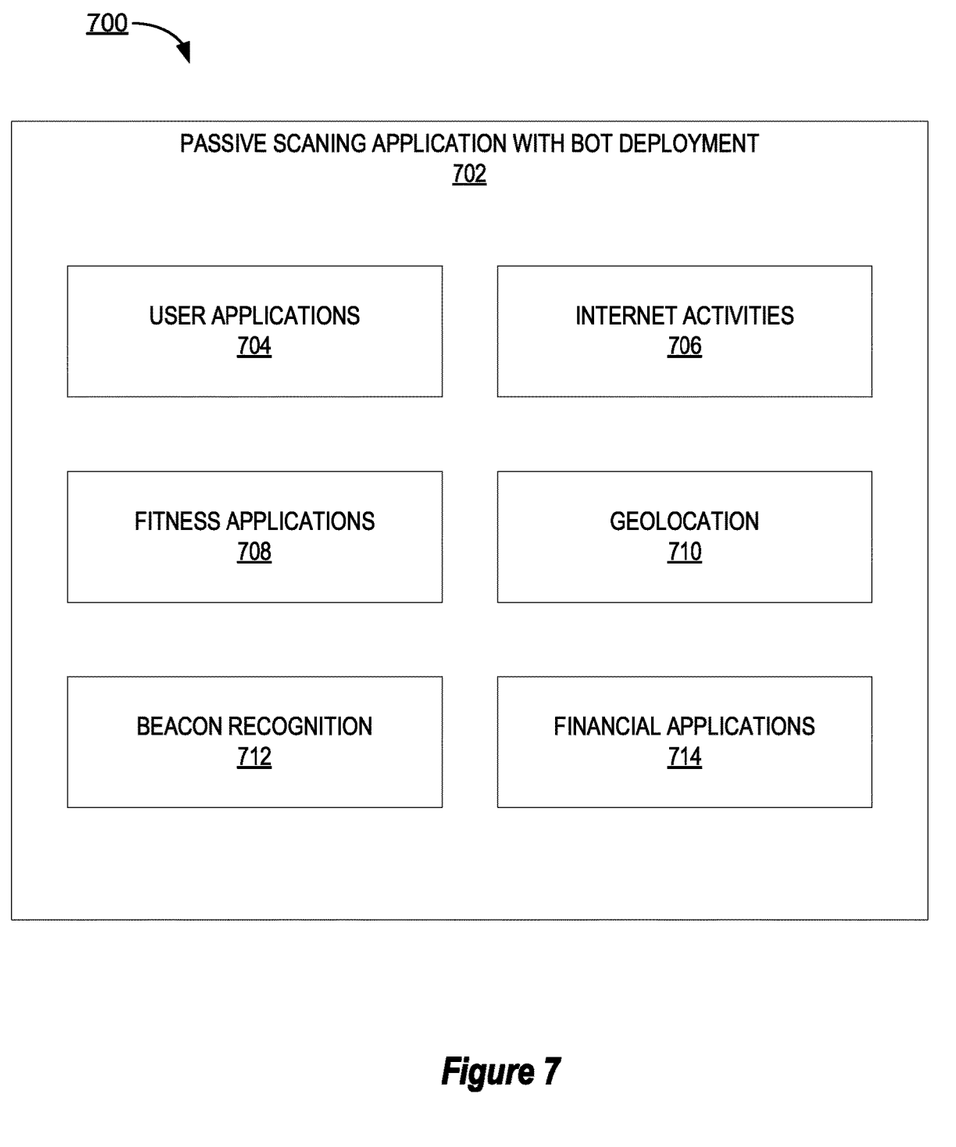
FIG. 7 presents a process flow for passive scan bot deployment locations and logistics, in accordance with embodiments of the present invention.

FIG. 7 presents a process flow for passive scan bot deployment locations and logistics 700, in accordance with embodiments of the present invention. As illustrated, the passive scanning application with bot deployment is illustrated in block 702. The passive scanning application with bot deployment may deploy bots for passive scanning of one or more applications, beacons, geolocation identifiers, or the like associated with a user to obtain passive data points. The bots may be deployed in user applications 704, fitness applications 708, beacon recognitions 712, internet activities 706, geolocations 710, and/or financial applications 714.

In some embodiments, bots may be deployed to passively extract data from user applications 704. In this way, the system may deploy bots to scan user applications on a mobile device associated with the user. In some embodiments, bots may be deployed to passively extract data from fitness applications 708, such as electronic devices, applications, or the like that calculate the health of the user. In some embodiments, bots may be deployed to passively extract data from beacon recognitions 712. In this way, the beacons may be at one or more locations at various entities to identify a location of the user and the transactions associated with the locations. In some embodiments, bots may be deployed to passively extract data from internet activities 706. In this way, the system may identify the user internet applications and deploy bots to scan transactions and the like associated with user internet activity. In some embodiments, bots may be deployed to passively extract data from geolocations 710 such as user GPS devices, mobile devices, or the like identifying user locations. In some embodiments, bots may be deployed to passively extract data from financial applications 714 associated with the user to identify recent resource allocations and deployments.

The system may extract and pull data and use the bots to pull into analytics to understand event patterning of the user. The system utilizes specificity filtering based on specifics of users and constantly, in real time updates a set of priority events for the user. This list is dynamic and changing over time. The list may be sourced to the user via selectable interface to ensure that the perceived priority events match the user's priorities. The system may further modify and filter the data to remove false indications that do not match the user. The data can be used to prompt the user for new products and services. In this way, the system studies customer applications, web activities, fitness activities, geolocation, and beacons data to determine and provide assessment and prioritization of real time resource requirements.

Figure 8:
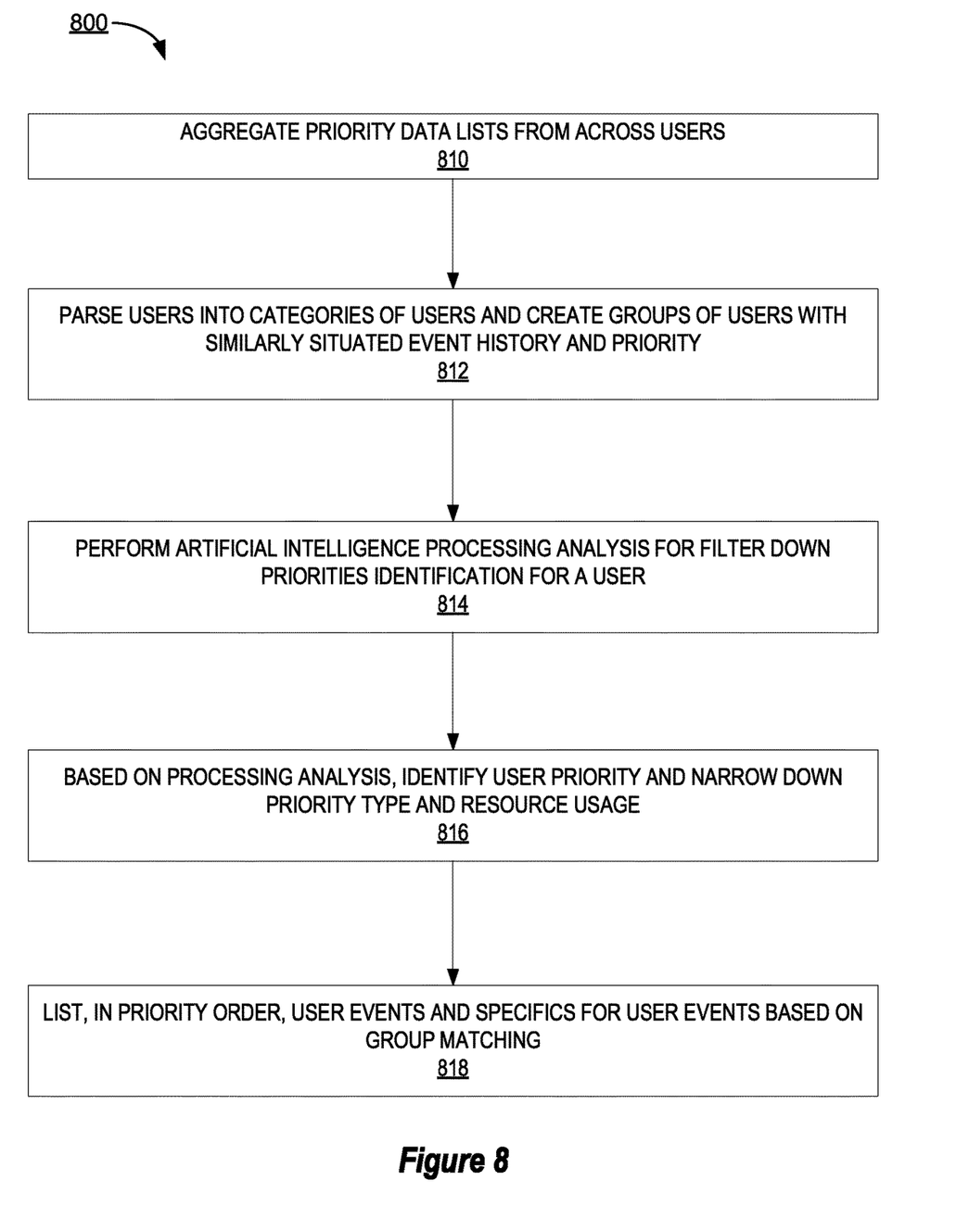
FIG. 8 presents a process flow for real time aggregation and categorization, in accordance with embodiments of the present invention.

FIG. 8 presents a process flow for real time aggregation and categorization 800, in accordance with embodiments of the present invention. As illustrated in block 810, the process 800 is initiated by aggregating priority data lists from across users. In this way, once the dynamic filtered event priority lists are generated for one or more users, the system may aggregate all of the lists across the various users.

Once aggregated, the system may parse the users into categories of users that are similar in life events, geolocation, or the like. In this way, the system may group the users into similarly situated users that have experience similar life events at or near the same time. As illustrated in block 812, the system parses users into categories of users and creates groups of users with similarly situated event history, priority, geolocation, and the like.

Next, as illustrated in block 814, the process 800 continues by performing artificial intelligence processing analysis for being able to filter down the priority identification for the user. As such, the system may be able to identify, with specificity, the user event priority and specifics for that priority. For example, the system may identify that the user's preparing for purchasing a vehicle based on the generated dynamic filtered event priority list of the user. However, now that the system has grouped the user with similarly situated users, the artificial intelligence processing may determine, based on the other users with in the group, that the user is predicted to be purchasing a sports utility vehicle instead of a car. In this way, the artificial intelligence processing is able to learn from the group associated with the user, to be able to predict specific patterns and types of purchases for the user within the life event.

As illustrated in block 816, the process 800 continues by identifying user priority and narrowing down priority type and resource usage based on the processing analysis of the grouped user. In this way, the system may compare the user priority to the group of users paired with that user. Using this analysis, the system may be able to narrow down, with specificity, the type of resources, the priority, the location, or the like of the predicted event.

Next, as illustrated in block 818, the process 800 is completed by generating a list, in priority order, of user events and specificities of the events for the user based on the processing analysis. As such, the system may provide a more robust listing of priority, in a corrected order, with specificity for the user. The user may provide an indication, via a user interface if the specificity and order are correct. If so, the system may provide a feedback loop to the artificial intelligence processing network for confirmation of the processing.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/267,518 | SYSTEM FOR ASSESSING AND PRIORITIZING REAL TIME RESOURCE REQUIREMENTS | Concurrently herewith |
| 16/268,062 | SYSTEM FOR SMART CONTRACT DEPENDENT RESOURCE TRANSFER | Concurrently herewith |
| 16/267,730 | SYSTEM FOR REAL TIME PROVISIONING OF RESOURCES BASED ON CONDITION MONITORING | Concurrently herewith |
| 16/267,521 | SYSTEM FOR REAL-TIME TRANSMISSION OF DATA ASSOCIATED WITH TRIGGER EVENTS | Concurrently herewith |
| 16/267,745 | NAVIGATION SYSTEM FOR MANAGING UTILIZATION OF RESOURCES | Concurrently herewith |

What is claimed is:

1. A system for resource requirement aggregation and categorization, the system comprises:
a memory device; and
a processing device operatively coupled to the memory device, wherein the processing device is configured to execute computer-readable program code to:
receive authentication from a user for real time assessment within a user network;
identify one or more devices and locations across the user network associated with the user;
deploy bots at the one or more devices and locations across the user network;
initiate passive scanning via the bots, wherein passive scanning identifies data communications associated the user;
perform event patterning analytics, wherein pattern analytics transform data communications associated with the user to priority data for predicting user events;
generate a dynamic filtered event priority list listing the predicted user events from the patterning analytics;
aggregate the priority data across multiple users;
group the users based on the priority data;

identify filtered down specificity identification for priority event via artificial intelligence analysis engine;

determine user priority list accuracy based on event history of users within the group and user confirmation of the user priority list accuracy; and upon receiving user confirmation of the user priority list accuracy, providing a communicable feedback loop to the artificial intelligence analysis engine confirming model prediction accuracy.

2. The system of claim 1, wherein identifying filtered down specificity identification for priority event via artificial intelligence analysis further comprises identifying specificity of the priority event based on group tendencies when users within the group perform the priority event of the user.

3. The system of claim 1, wherein deploying passive bots at one or more locations across the user network further comprises systematic passive scanning of communications across each of the one or more devices and locations across the user network associated with the user.

4. The system of claim 1, wherein initiating passive scanning via the bots further comprises extracting data across the user network for identification of current or historic user events, wherein user events include financial, social, or location modification events of the user.

5. The system of claim 1, wherein deploying passive bots at one or more locations across the user network further comprises deploying passive bots at user applications, fitness applications, beacon applications, internet portals, geolocation devices, and financial applications.

6. A computer program product for resource requirement aggregation and categorization, the computer program product comprising at least one non-transitory computer-readable medium having computer-readable program code portions embodied therein, the computer-readable program code portions comprising:

an executable portion configured for receiving authentication from a user for real time assessment within a user network;

an executable portion configured for identifying one or more devices and locations across the user network associated with the user;

an executable portion configured for deploying bots at the one or more devices and locations across the user network;

an executable portion configured for initiating passive scanning via the bots, wherein passive scanning identifies data communications associated the user;

an executable portion configured for performing event patterning analytics, wherein pattern analytics transform data communications associated with the user to priority data for predicting user events;

an executable portion configured for generating a dynamic filtered event priority list listing the predicted user events from the patterning analytics;

an executable portion configured for aggregating the priority data across multiple users;

an executable portion configured for grouping the users based on the priority data;

an executable portion configured for identifying filtered down specificity identification for priority event via artificial intelligence analysis engine;

an executable portion configured for determining user priority list accuracy based on event history of users within the group and user confirmation of the user priority list accuracy; and an executable portion configured for, providing upon receiving user confirmation of the user priority list accuracy, a communicable feedback loop to the artificial intelligence analysis engine confirming model prediction accuracy.

7. The computer program product of claim 6, wherein identifying filtered down specificity identification for priority event via artificial intelligence analysis further comprises identifying specificity of the priority event based on group tendencies when users within the group perform the priority event of the user.

8. The computer program product of claim 6, wherein deploying passive bots at one or more locations across the user network further comprises systematic passive scanning of communications across each of the one or more devices and locations across the user network associated with the user.

9. The computer program product of claim 6, wherein initiating passive scanning via the bots further comprises extracting data across the user network for identification of current or historic user events, wherein user events include financial, social, or location modification events of the user.

10. The computer program product of claim 6, wherein deploying passive bots at one or more locations across the user network further comprises deploying passive bots at user applications, fitness applications, beacon applications, internet portals, geolocation devices, and financial applications.

11. A computer-implemented method for resource requirement aggregation and categorization, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving authentication from a user for real time assessment within a user network;

identifying one or more devices and locations across the user network associated with the user;

deploying bots at the one or more devices and locations across the user network;

initiating passive scanning via the bots, wherein passive scanning identifies data communications associated the user;

performing event patterning analytics, wherein pattern analytics transform data communications associated with the user to priority data for predicting user events;

generating a dynamic filtered event priority list listing the predicted user events from the patterning analytics;

aggregating the priority data across multiple users;

grouping the users based on the priority data;

identifying filtered down specificity identification for priority event via artificial intelligence analysis engine;

determining user priority list accuracy based on event history of users within the group and user confirmation of the user priority list accuracy; and upon receiving user confirmation of the user priority list accuracy, providing a communicable feedback loop to the artificial intelligence analysis engine confirming model prediction accuracy.

12. The computer-implemented method of claim 11, wherein identifying filtered down specificity identification for priority event via artificial intelligence analysis further comprises identifying specificity of the priority event based on group tendencies when users within the group perform the priority event of the user.

13. The computer-implemented method of claim 11, wherein deploying passive bots at one or more locations across the user network further comprises systematic passive scanning of communications across each of the one or more devices and locations across the user network associated with the user.

14. The computer-implemented method of claim 11, wherein deploying passive bots at one or more locations across the user network further comprises deploying passive bots at user applications, fitness applications, beacon applications, internet portals, geolocation devices, and financial applications.

* * * * *